Feb. 17, 1925.

E. A. SMITH ET AL 1,526,646

AUTOMATIC LUBRICATOR

Filed April 30, 1923

WITNESSES

INVENTORS

Patented Feb. 17, 1925.

1,526,646

UNITED STATES PATENT OFFICE.

EDGAR A. SMITH AND NORMAN H. MOORE, OF WICHITA FALLS, TEXAS.

AUTOMATIC LUBRICATOR.

Application filed April 30, 1923. Serial No. 635,707.

*To all whom it may concern:*

Be it known that we, EDGAR A. SMITH and NORMAN H. MOORE, citizens of the United States, residing at Wichita Falls, in the county of Wichita and State of Texas, have invented a new and useful Automatic Lubricator, of which the following is a specification.

The invention relates to an automatic lubricator to be used in connection with steam engines and the like.

The object of this invention is to provide a lubricator that operates entirely automatically.

A further object of the invention is to provide an automatic lubricator of this nature that will supply the necessary quantity of oil when the engine is in operation and will stop the flow of oil when the engine is not running. The flow of oil increases with the speed of the engine.

Another object of the invention is to provide a device of this nature that is very simple and practical and can be manufactured and sold at a very nominal cost.

The nature and advantages of the invention will be better understood when the following detail description is read in connection with the accompanying drawing forming a part of this application. The invention resides in the construction, combination and arrangement of parts as claimed.

Figure 1:
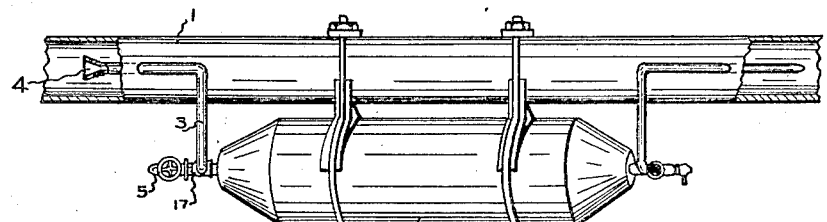

In the accompanying drawing the various parts will be referred to by numbers. And, therein, Figure 1 is a top view partly sectioned.

Figure 2:
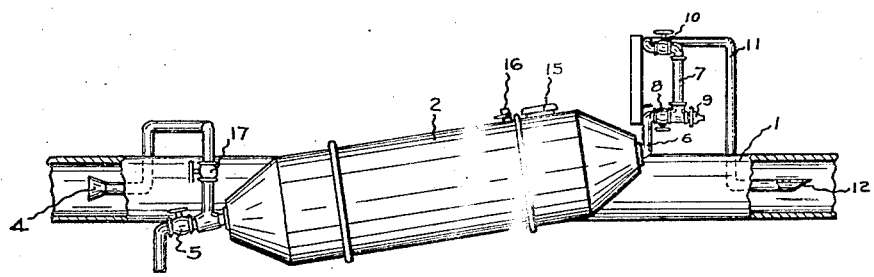

Figure 2 is a side view partly sectioned.

The device forming the subject matter of this invention comprises a steam pipe 1 leading from the boiler to the engine. 2 is a reservoir. 3 is a pipe leading from the steam pipe 1 having a flanged end arranged thereon inside of the steam pipe 1, with the opening toward the source of steam, as illustrated at 4. 5 is a drain valve arranged thereon. 6 is a pipe leading from the other end of the reservoir to the sight feed glass 7. 8 is an adjusting valve. 9 is a drain cock, as shown. 10 is a cutoff valve. 11 is a pipe leading from the cutoff valve 10 to the steam pipe 1 terminating therein. The opening being cut in a slanting position, as illustrated at 12. The opening being toward the engine or the point where the steam is being consumed. 15 is a filler cap on the reservoir 2. 16 is an air vent to allow the air to pass out of the reservoir 2 while being filled. 17 is a cutoff valve.

The device operates in the following manner: When the reservoir 2 is filled with oil and the valve 17 is opened the steam pressure enters through the flange 4 of the pipe 3 into the reservoir 2 forcing the oil through the pipe 6, the quantity of oil desired is regulated by the adjusting valve 8 as it passes through the sight feed glass 7 into the steam pipe 1 through the pipe 11, whence the steam therein carries it to the engine cylinder, lubricating the same.

While it is believed from the foregoing description the nature and advantages of the invention will be readily apparent, we desire to have it understood that we do not limit ourselves to what is herein shown and described, and that such changes may be resorted to, when desired, as fall within the scope of what is herein claimed.

What we claim is:

In an automatic lubricator, the combination of an oil reservoir disposed in longitudinal relation with a steam pipe, a tubular member attached at one end to one end of said reservoir, and the opposite end of said tubular member inserted in the said steam pipe axially thereof, said opposite end of said tubular member being increased in a cone shape and opening toward the source of steam supply, a tubular member attached at one end to the opposite end of said reservoir, and the opposite end of said tubular member inserted in the said steam pipe axially thereof, the end last mentioned being cut obliquely and opening toward the point of steam consumption.

EDGAR A. SMITH.
NORMAN H. MOORE.

Witnesses:
C. B. TONEY, Jr.,
FRED L. BRONSON,